US011813807B1

(12) United States Patent
LaCounte

(10) Patent No.: US 11,813,807 B1
(45) Date of Patent: Nov. 14, 2023

(54) GLASS REINFORCED POLYMER COMPOSITE AND METHOD OF MANUFACTURE

(71) Applicant: TekModo Holdings, LLC, Elkhart, IN (US)

(72) Inventor: Marc Douglas LaCounte, Goshen, IN (US)

(73) Assignee: TekModo Industries, Inc., Elkhart, IN (US)

( * ) Notice: Subject to any disclaimer, the term of this patent is extended or adjusted under 35 U.S.C. 154(b) by 939 days.

(21) Appl. No.: 16/406,192

(22) Filed: May 8, 2019

Related U.S. Application Data

(60) Provisional application No. 62/668,875, filed on May 9, 2018.

(51) Int. Cl.
| | |
|---|---|
| B29C 70/30 | (2006.01) |
| B29C 37/00 | (2006.01) |
| B29C 70/54 | (2006.01) |
| B29C 70/50 | (2006.01) |
| B29C 70/08 | (2006.01) |
| B29C 70/10 | (2006.01) |

(52) U.S. Cl.
CPC ............ *B29C 70/30* (2013.01); *B29C 37/0032* (2013.01); *B29C 70/086* (2013.01); *B29C 70/088* (2013.01); *B29C 70/10* (2013.01); *B29C 70/50* (2013.01); *B29C 70/545* (2013.01); *B29K 2101/00* (2013.01); *B29K 2309/08* (2013.01); *B29K 2313/00* (2013.01)

(58) Field of Classification Search
CPC .... B29C 70/30; B29C 37/0032; B29C 70/086; B29C 70/088; B29C 70/50; B29K 2101/00; B29C 70/10; B29C 70/545; B29K 2313/00
See application file for complete search history.

(56) References Cited

U.S. PATENT DOCUMENTS

| | | | | |
|---|---|---|---|---|
| 5,030,488 | A * | 7/1991 | Sobolev | B32B 15/20 |
| | | | | 428/464 |
| 5,087,405 | A * | 2/1992 | Maker | B29C 37/0032 |
| | | | | 264/245 |
| 5,482,667 | A * | 1/1996 | Dunton et al. | B29C 70/086 |
| | | | | 156/166 |
| 6,595,699 | B1 * | 7/2003 | Nguyen et al. | G02B 6/4231 |
| | | | | 385/88 |
| 6,755,633 | B2 | 6/2004 | Miller | |

(Continued)

OTHER PUBLICATIONS

Master Bond Inc, One Component Snap Cure Adhesive, retrieved on May 31, 2022, published on Jul. 13, 2012, Azo Materials, https://www.azom.com/article.aspx?ArticleID=6160 (Year: 2012).*

*Primary Examiner* — Francisco W Tschen
*Assistant Examiner* — Elisa H Vera
(74) *Attorney, Agent, or Firm* — Krieg DeVault LLP; Daniel Tychonievich

(57) ABSTRACT

A method and process is provided for manufacturing a glassed reinforced polymer composite laminate panel. The method and process includes the steps of providing a mold including a flexible polymer film; depositing a layer of gel coat on the flexible polymer film; curing the layer of gel coat to provide a semi-rigid intermediate panel; applying a layer of resin material overtop of the cured gel coat layer; laying a sheet of woven or non-woven surface veil material over top of the cured gel coat layer; laying a sheet of glass reinforced matte overtop of the surface film sheet; applying a second layer of resin material overtop the sheet of glass reinforced matte to form the glassed reinforced polymer composite laminate panel; and curing the glassed reinforced polymer composite laminate panel. The method for manufacturing the composite laminate panel can be a continuous process making a panel of indeterminate length.

12 Claims, 11 Drawing Sheets

(56) References Cited

U.S. PATENT DOCUMENTS

| | | | | |
|---|---|---|---|---|
| 2001/0055662 | A1* | 12/2001 | Fusco | B44C 5/0446 |
| | | | | 428/113 |
| 2005/0067113 | A1* | 3/2005 | Colson et al. | D04H 3/07 |
| | | | | 156/580 |
| 2007/0241478 | A1* | 10/2007 | Buckley | B29B 11/16 |
| | | | | 264/257 |
| 2011/0221093 | A1* | 9/2011 | Perrow et al. | B29C 70/48 |
| | | | | 264/255 |
| 2014/0065397 | A1* | 3/2014 | Johnson et al. | B32B 27/08 |
| | | | | 428/220 |

* cited by examiner

GLASS REINFORCED POLYMER COMPOSITE AND METHOD OF MANUFACTURE

BACKGROUND OF THE INVENTION

The present application claims priority to U.S. Provisional Pat. Application Serial No. 62/668,875, filed on May 9, 2018, the complete disclosure of which is expressly incorporated herein by reference.

The subject invention pertains to a glass reinforced polymer composite material and method of manufacturing the composite, and in particular, to a material and process for producing a lightweight, high-gloss surface skin that is particularly suitable for use in recreational vehicles and trucks and conversions thereof.

In the recreational vehicle industry, truck industry, and for conversion vehicles, it is common to use wall panels including fiberglass reinforcement for the exterior surface of a vehicle. The panels may have a variety of widths and commonly fall in an 8 foot to 10 foot range. It is also common to have established lengths for the panels, which include panels that may be as long as 40 feet or even more. While the composite material from which panels are made, have provided to be adequate material for recreational vehicles and other vehicle sidewalls, it would be desirable if the presently used processes and equipment could be improved with better surface finish and with continuous panels that may be accumulated in a roll and then cut to a desired length for use in the manufacture of the vehicle. Presently used processes are also cumbersome from a manufacturing process including many movements of the panels to various stations, which increases the cost thereof.

In known and currently used processes, a composite material first begins with utilization of an elongated mold. The mold is somewhat larger in both the width and length, than the panels to be made to facilitate trimming of the panels. The mold surface of the panels is finished to provide a substantially flat and smooth surface, and the surface on the mold may be used to form the visible exterior surface of the panel.

In a known prior art method of manufacturing panels, a mold is first sprayed with a coating known as a gel coating, which cures to form a high gloss exterior surface for the panel. Once cured, a resin and fiberglass are applied to the top surface of the gel coating and then a plurality of panels, typically hard board, such as luan panels, are positioned side by side on top of the fiberglass. The seams between the panels are covered with a seam material and a vacuum bag is placed over the top of the panels and a slight vacuum is introduced which draws resin into luan panels to form a finished product. A completed product is then pulled off the mold and cut and trimmed to the proper size.

One method of applying the gel coating is to maintain the elongated mold in a stationary fashion then move the gel coating sprayer longitudinally along rails and spray the entire length of elongated mold. This can provide a sufficient gel coating on the mold, but due to the movement of the sprayer, capturing the fumes of the gel coating can be difficult. Furthermore, as maintenance of the mold is required, the molds are moved into and out of their various positions by way of an overhead crane, which due to the size of elongated mold, can be a difficult operation. An object of the invention is therefore to overcome the shortcomings of the prior art.

SUMMARY OF THE INVENTION

In one embodiment of the invention a method and process is provided for manufacturing a glassed reinforced polymer composite laminate panel. The method and process includes the steps of providing a mold including a flexible polymer film; depositing a layer of gel coat on the flexible polymer film; curing the layer of gel coat to provide a semi- rigid intermediate panel; applying a layer of resin material overtop of the cured gel coat layer; laying a sheet of woven or non-woven surface veil material over top of the cured gel coat layer; laying a sheet of glass reinforced matte overtop of the surface film sheet; applying a second layer of resin material overtop the sheet of glass reinforced matte to form the glassed reinforced polymer composite laminate panel; and curing the glassed reinforced polymer composite laminate panel.

Another feature of the invention is that the method for manufacturing the composite laminate panel can be a continuous process making a panel of indeterminate length.

In another aspect of the invention, the method for manufacturing a glassed reinforced polymer composite laminate panel can further include the step of applying a second flexible polymer film on top of the second layer of resin material before the composite laminate panel is cured. The method for manufacturing a glassed reinforced polymer composite laminate panel can further include the step of nip rolling all of the layers together to integrate resin into the sheet of surface veil material and sheet of glass reinforced matte. The method for manufacturing a glassed reinforced polymer composite laminate panel can further include the step of a rolling process to roll the sheet of surface veil material and sheet of glass reinforced matte into the first layer of resin material before the second layer of resin is applied.

The method for manufacturing a glassed reinforced polymer composite laminate panel may further include the step of providing a cooling area where the continuously fed composite laminate panel is cooled after curing. The method for manufacturing a glassed reinforced polymer composite laminate panel may further include the steps of providing an end roll and rolling the cooled composite laminate panel on the end roll.

The method for manufacturing a glassed reinforced polymer composite laminate panel can further include the step of applying a second layer of gel coat over the first layer of gel coat before curing the gel coat and laying the sheet of surface veil material.

The method for manufacturing a glassed reinforced polymer composite laminate panel can include the step that the layers of gel coat are sprayed on the polymer film using reciprocating spray heads as the polymer film travels thereby. The resin layers can also be applied using reciprocating spray heads.

The method for manufacturing a glassed reinforced polymer composite laminate panel can further include the step of trimming the composite laminate panel to a desired width.

The method for manufacturing a glassed reinforced polymer composite laminate panel may further include the step of removing the sheets of flexible polymer film after the polymer composite laminate panel has cooled.

In further aspects of the invention, the method for manufacturing a glassed reinforced polymer composite laminate panel can include the polymer films, the sheet of surface veil material, and the sheet of glass reinforced matte being fed from rolls of respective material. The method for manufacturing a glassed reinforced polymer composite laminate panel may include the step of feeding the sheet of surface veil material and sheet of fiberglass reinforcement matte simultaneously onto the first layer of resin before the panel is rolled.

In another embodiment of the invention, a glass reinforced polymer composite laminate panel is provided that includes a first layer of a polymer film; a layer of gel coating on top of the polymer film; a layer of resin over top of the layer of gel coating; a sheet of woven or nonwoven surface veil material on top of the resin; and a sheet of fiberglass reinforcement matte overtop of the surface veil material.

In an additional aspect of the invention, the glass reinforced polymer composite laminate panel may further including a second layer of resin overtop of the sheet of fiberglass reinforcement matte. A second sheet of polymer film may also be laid overtop of the second layer of resin.

In another feature of the invention, the glass reinforced polymer composite laminate panel can be provided in a rolled configuration.

In another aspect of the invention, a second layer of gel coating can be provided between the first layer of gel coating and the layer of resin.

Yet another feature of the invention is that glass reinforced polymer composite laminate panel can be provided wherein the layers of gel coating are cured before applying the first layer of resin and the polymer composite laminate panel is also cured.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein.

Figure 1:
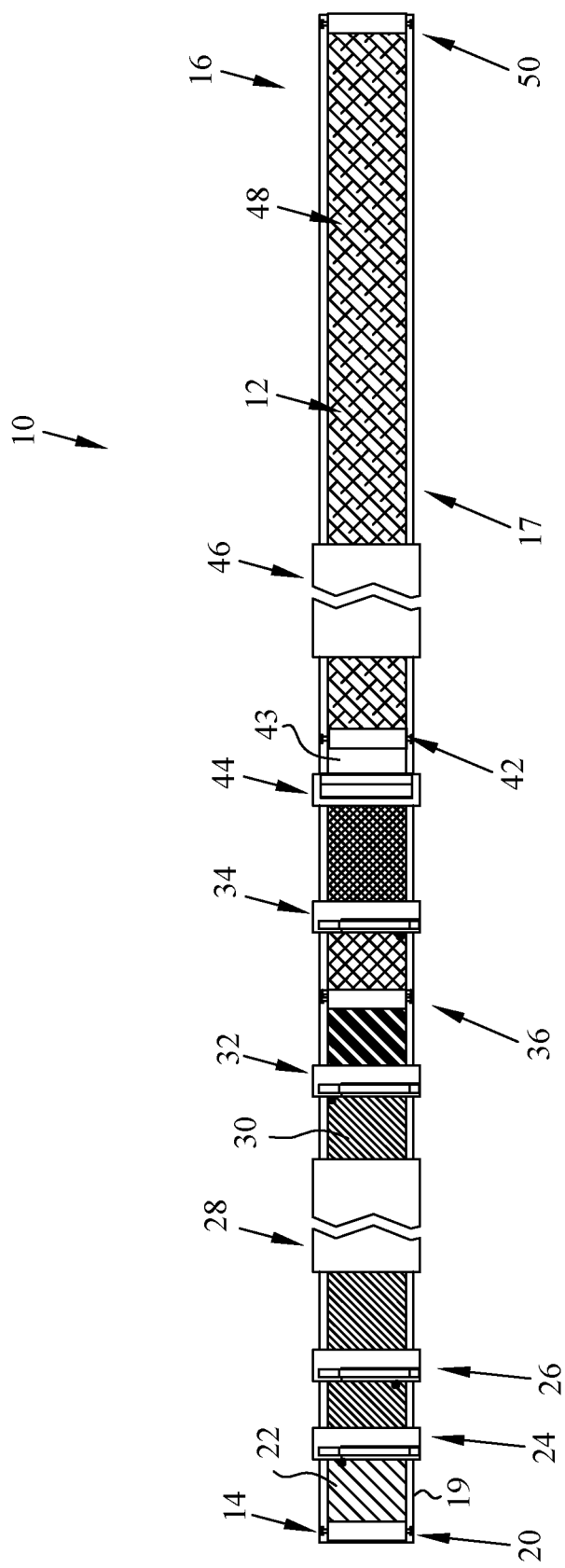
FIG. 1 is a plan of the system for producing a glass reinforced polymer composite material in accordance with the subject invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Figure 2:
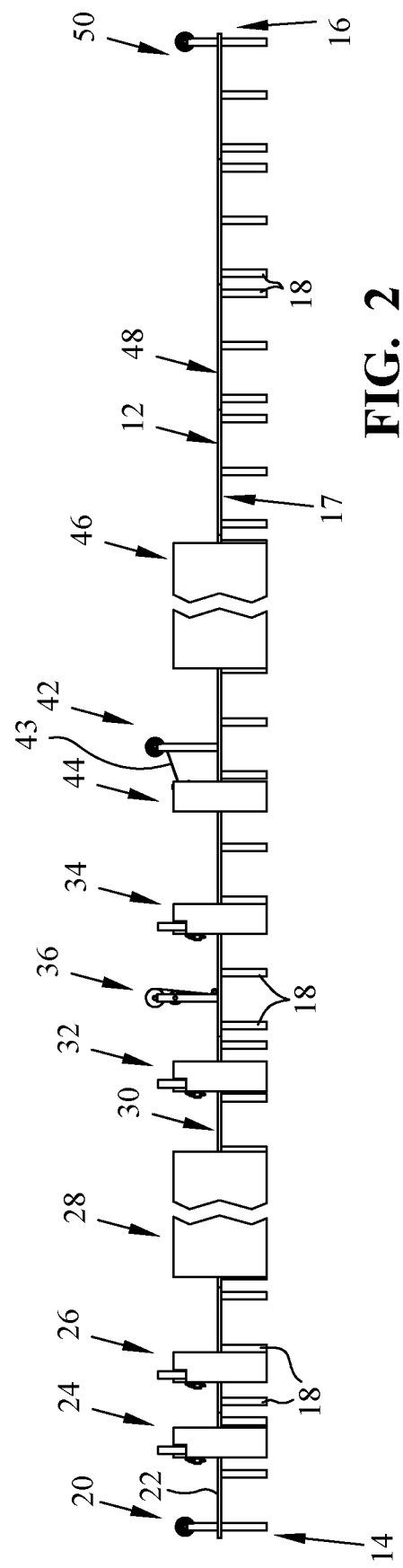
FIG. 2 is a side view of the system of FIG. 1.
Figure 3:
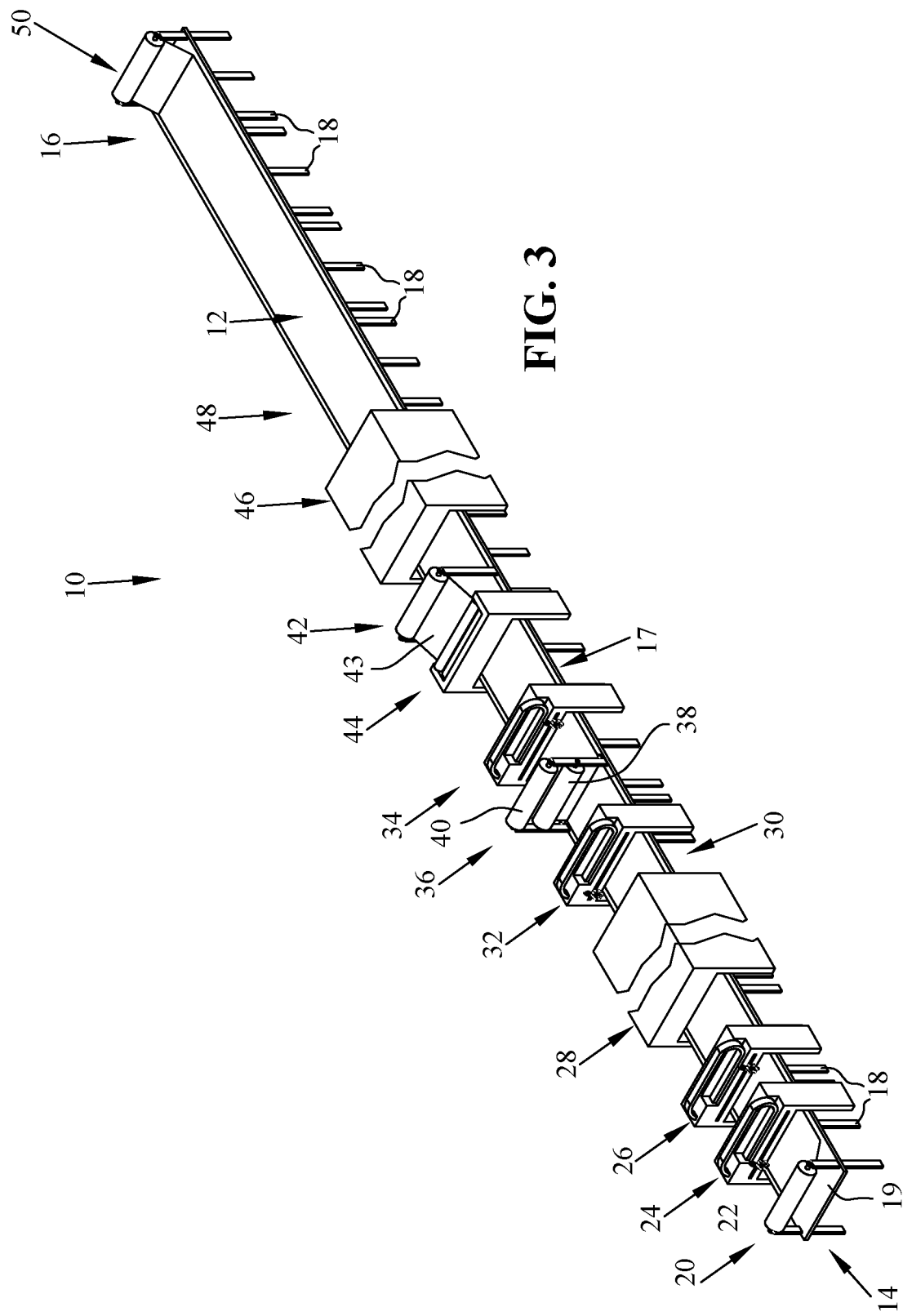
FIG. 3 is a perspective view of the system of FIG. 1.

Now referring to FIGS. 1-3, a line or system for producing a glass reinforced polymer composite material is shown generally indicated as 10. System 10 is used to produce a glass reinforced polymer composite laminate, generally indicated as 12. Line 10 includes a starting end, generally indicated as 14, from which glass reinforced polymer composition 12 is initiated to be manufactured and a finished end, generally indicated as 16, wherein composition 12 is complete. Line 10 includes a linear framework, generally indicated as 17 for supporting composite laminate 12 as it is being manufactured. The framework is made from well-known structural members and includes a plurality of legs or supports 18 to set the framework at a desired height. A table 19 running the length of line 10 supports composite laminate panel 12 while it is being manufactured.

Line 10 includes a multiplicity of stations or steps from which the glass reinforced polymer composition 12 is manufactured. The first stage or step, generally indicated as 20 is a feed roll for a plastic or polymer film 22 from which the laminate glass reinforced polymer composite material is built from. Polymer film 22 may be pulled along line 10 at a belt speed of about 5 feet per minute. As discussed in further detail below, plastic or polymer film 22 acts as the mold to form the exterior surface of panels to be exposed on the recreational vehicle or other vehicle on which it is used. One suitable type of plastic film is polyethylene terephthalate, which is commonly referred to BoPET, and one suitable type of film is sold under the brand name Mylar®. Of course, other suitable films having similar properties of strength, heat resistance, and resistance to sticking may be used as a mold for the subject invention. As should be appreciated and as discussed in further detail, utilizing a thin flexible indeterminate length flexible mold, both provides manufacturing advantages and an improved surface finish over the rigid fixed length prior art molds.

The next two stations are gel coating spray stations generally indicated as 24 and 26, respectively. As will be discussed in further detail below, in each gel coat spray station 24, 26 a layer of gel coat is sprayed on Mylar film 22 for a width that exceeds the finished width dimension of the laminate composite panel. The next station is a curing station, generally indicated as 28 which snap cures the gel coat to make a semi-rigid product/panel, generally indicated as 30.

The first of two spray laminating resin stations is generally indicated as 32. A second spray laminating resin station, generally indicated as 34, is down line from station 32 and separated therefrom by a material feeding station, generally indicated as 36. A layer of resin is sprayed across the semi-rigid partially formed panel 30 at spray laminating resin station 32, and the panel then proceeds into material feeding station 36 where two sheets or layers of material are introduced. Material feeding station 36 includes a first feeding roll 38 for feeding a surface veil material 39, which may be woven or non-woven material and a second feeding roll 40, which feeds in a sheet or matte of reinforced fiberglass material 41. The surface veil sheet 39 is designed to prevent the outer surface of polymer composite laminate 12 from having an uneven, dimpled or orange peel-like surface so that the outer surface of reinforced polymer composite laminate 12 has a smooth exterior surface for the panel, and may be like a cheese cloth material. Fiberglass reinforcement sheet 41 from feeding role 40 provides strength and toughness to the panel, as will be discussed in further detail below. The surface veil material 39 from feeding material roll 38 will go down first on top of the resin layer deposited from spray laminating resin station 32 and the fiberglass reinforcing sheet 41 from feeding material roll 40 will lay on top thereof. The sheets are pressed into the resin material with a roller as will be discussed further in greater detail below and from there travels to second spray laminating resin station 34, wherein a second layer of resin is sprayed over the top of the sheet of fiberglass reinforcing matte.

After a second layer of resin is sprayed over the top of the sheet of fiberglass reinforcement matte, the laminate panel continues down line 10 to stations 42 and 44. Station 42 is a feeding role to feed a top Mylar film 43. Top Mylar film 43 covers the top resin layer sprayed at resin station 34 and a nip rolling station 44 serves to press the laminated structure together to form the completed glass reinforced polymer composition panel 12.

From nip rolling station 44, the continuous length polymer composite laminate 12 is then fed into a curing station, generally indicated as 46 wherein the laminate panel is heated and cured. From curing station 46, laminate panel 12 then travels onto an elongated cooling area, generally indicated as 48 wherein the temperature of the panel cools down sufficiently in order to be rolled. After sufficiently cooled, an end/finished rolling station, generally indicated as 50, can be used to roll the completed composite laminate panel 12 into a rolled configuration for easy storage and transportation thereof.

Figure 4:
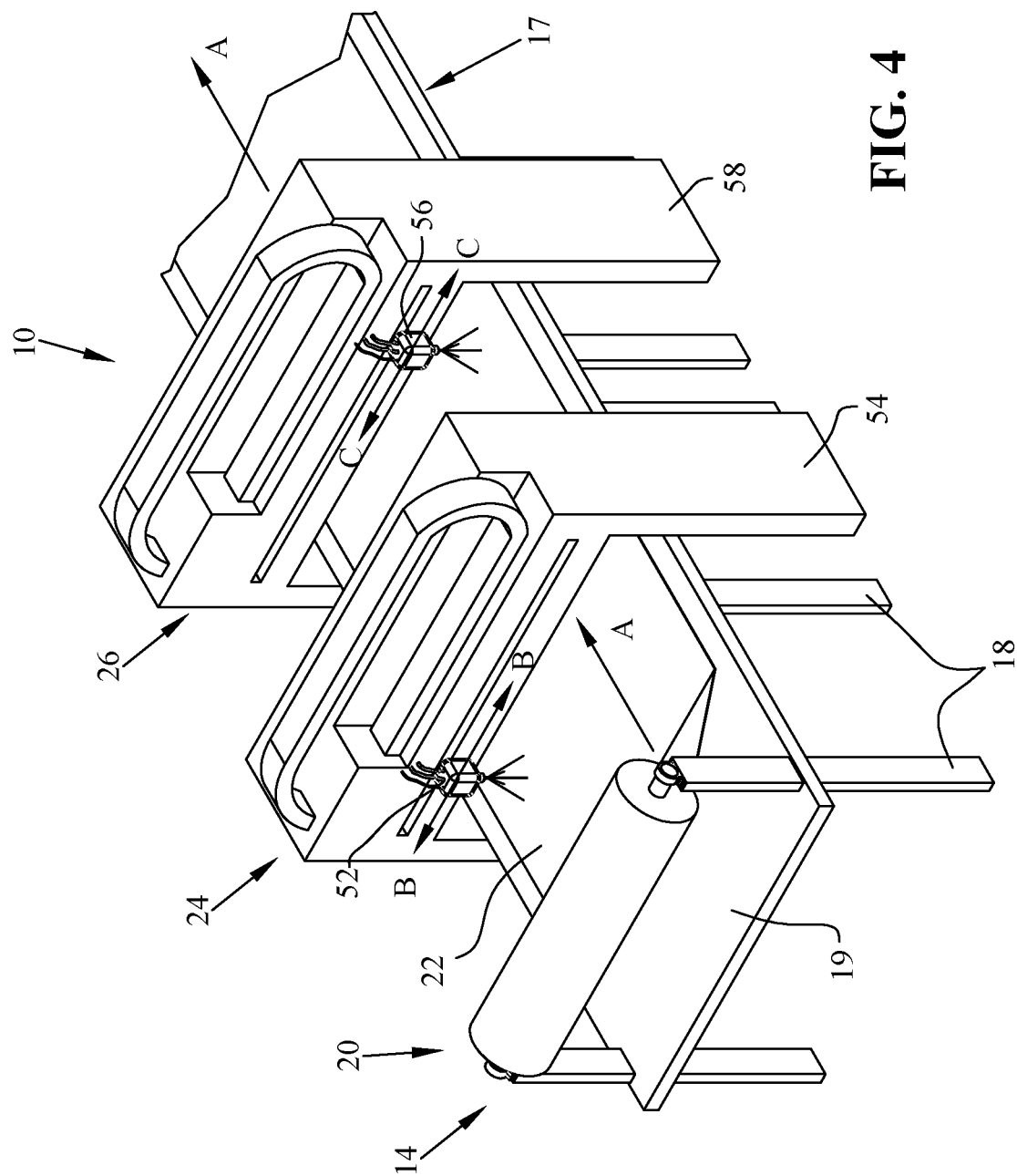
FIG. 4 is a perspective view of a Mylar roll feeding into gelcoat sprayers.

Now referring to FIG. 4, an enlarged view of stations 20, 24, and 26 is shown. Mylar film 22 is pulled along line framework 17 in the longitudinal direction of line 10 corresponding to arrows A. Gel coat spray station 24 includes a spray head 52 for spraying a gel coat on top of Mylar film 22, which serves as the bottom mold for glass reinforced polymer composite laminate panel 12. As Mylar film 22 is moved in longitudinal direction corresponding to arrows A, the spray head 52 moves in a reciprocating transverse direction corresponding to arrows B-B that is generally perpendicular to the direction Mylar film 22 moves corresponding to arrow A. Gel coating station 24 also includes a framework 54. Framework 54 is stationary and does not move as Mylar film 22 is being fed beneath reciprocating gel spray head 52. As should be appreciated by one skilled in the art, the width of the reciprocation of gel spray head 52 corresponds to a desired width of the final glass reinforced polymer composite laminate panel 12. and the width sprayed is wider than the final panel to allow for trim. The travel speed of reciprocation of spray head 52 can be varied to adjust the thickness of the corresponding gel layer. After gel coated Mylar film 22 passes beneath spray station 24, it continues until it comes to the second gel coat spray station 26. Spray station 26 includes a second gel spray head 56, which like spray head 52 moves in a reciprocating transverse direction back and forth along arrows C-C transverse to the direction corresponding to arrow A in which gel coated Mylar film 22 is moving. Spray station 26 also includes a framework 58, which is stationary while panel 12 is being made. Upon exiting the second gel coat spray station 26, Mylar film 22 now has two coats of gel spray thereon. In one embodiment of the invention, the thickness of the gel coats is approximately 10 mils each.

Figure 5:
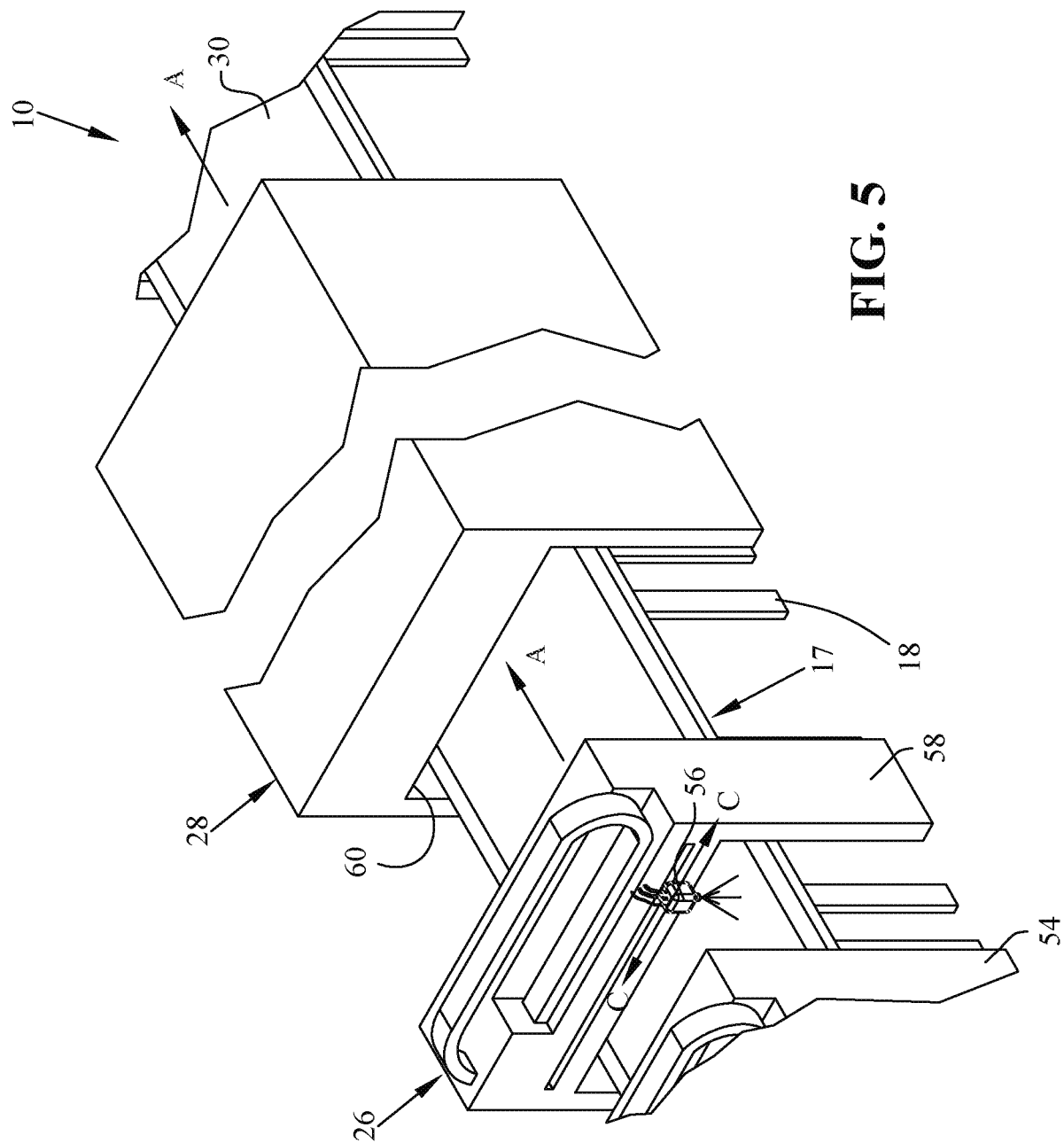
FIG. 5 is a perspective of the gel coated Mylar roll feeding into a dryer.

Now referring to FIG. 5, an enlarged view of line 10 showing the snap cure station 28 is depicted. Upon exiting the second gel coat spray station 26, Mylar film 22, having two layers of gel coating thereon, enters into snap cure station 28. Snap cures station 28 includes an opening 60 through which line 10 enters the snap cure station 28 and line framework 17 extends there through. As Mylar film 22 and the gel coat thereon travel through snap cure station 28, the gel coating is cured into a semi-rigid state to form semi-rigid partial panel 30. This process of snap curing the gel coating helps eliminate read through of the surface veil and fiberglass reinforcement sheets, which are added down the line. In other words, curing the gel coat at this time helps provide a smooth unimpaired surface finish to panel 12 once the Mylar film 22 is removed.

Figure 6:
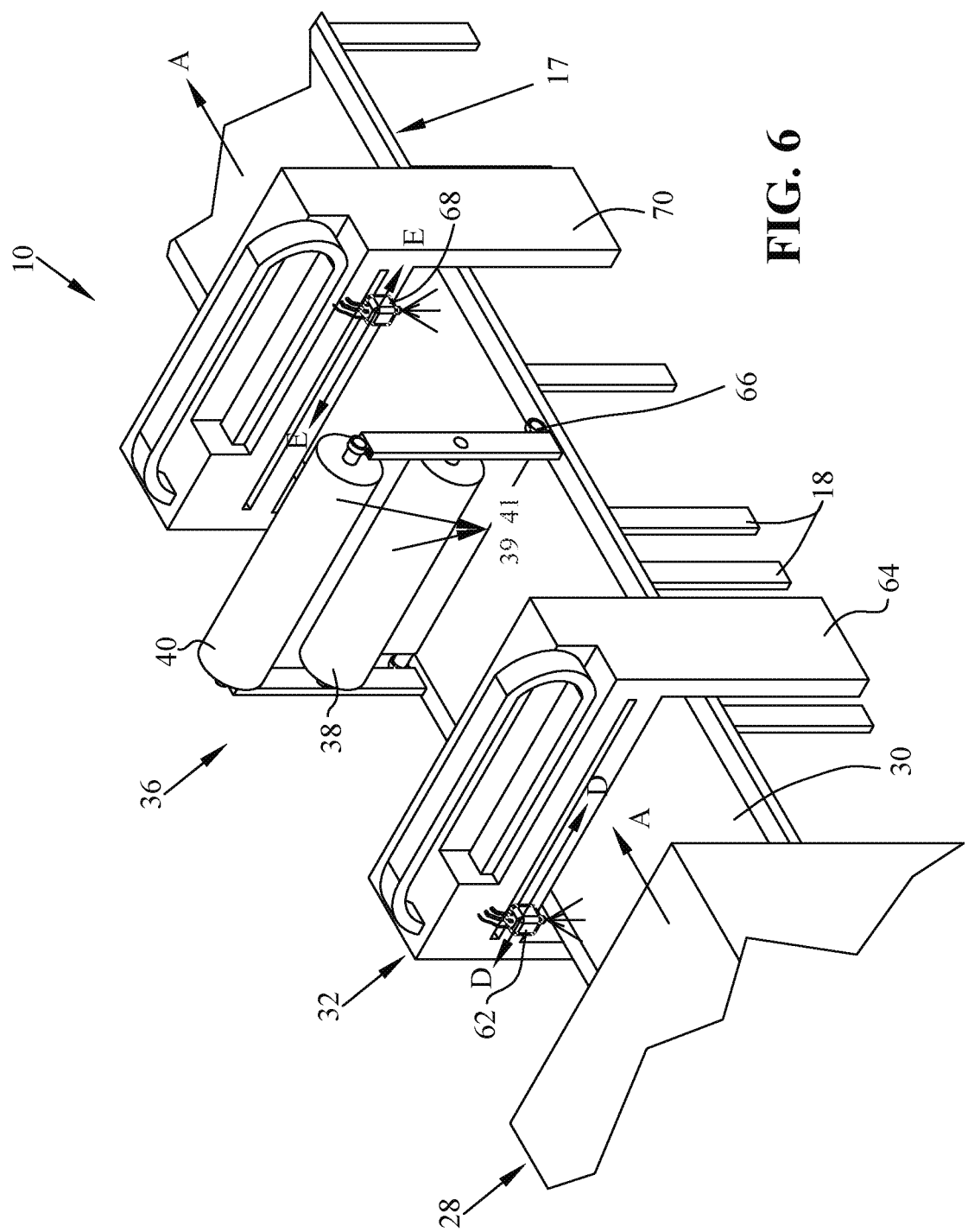
FIG. 6 is a perspective view of the present in fiberglass feeding station.
Figure 10:
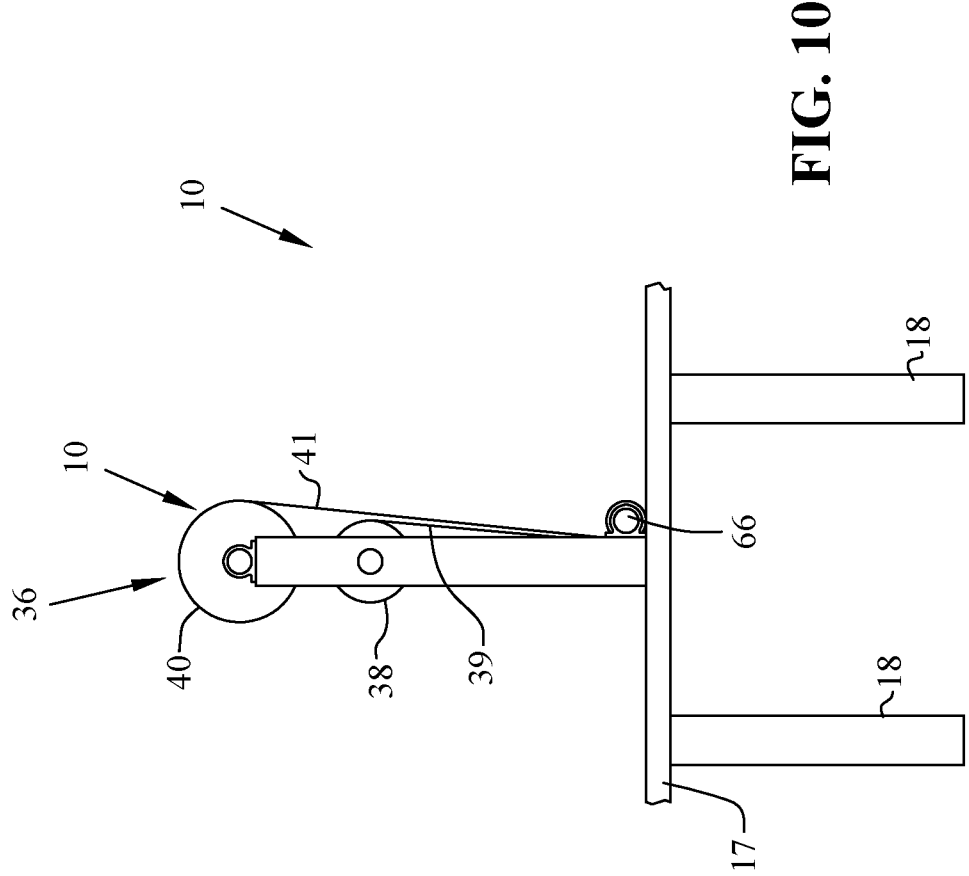
FIG. 10 is a side view showing feeding of the fiberglass sheet and veil.

Now referring to FIGS. 6 and 10, an enlarged view of spray laminating resin stations 32 and 34 is shown along with material feeding station 36. After semi-rigid panel 30 exits curing station 28, it continues to be pulled and move in arrow direction A, along line 10 and framework 17 to spray laminating resin station 32, which includes a reciprocating resin spray head 62. Resin spray head 62 moves in a reciprocating manner along arrows D-D, which is in a direction generally transverse to arrow direction A in which semi-rigid panel 30 is traveling. Resin spray head 62 is mounted and reciprocates on a framework 64, which remains stationary while the panel is being formed. It should be appreciated that resin spray head 62 reciprocates for a width approximate the width that the gel was deposited on the panel and in a width slightly larger than the width of the finished panel 12, in order to allow for trimming. The thickness of the resin deposit can be adjusted by the type of spray head used and pattern thereon, as well as the pressure in the resin lines and speed in which resin spray head 62 reciprocates. Upon exiting spray laminating resin station 32, the panel travels to material feeding station 36 wherein two sheet layers of material are laid down over top of the resin deposited at resin station 32. A sheet of surface of the veil surface material 39 is fed from material feeding roll 38 and is laid down first on the resin deposit, and simultaneously from material feeding roll 40, a sheet of fiberglass reinforcement matte 41 is laid over top of the surface film. The surface film and fiberglass reinforcing sheets are pressed into the deposited resin via a roll 66. From there, the partially formed laminate panel continues down line 10 in arrow direction A to the second spray laminating resin station 34, which includes a resin spray head 68. Resin spray head 68 is mounted on and reciprocates on a framework 70. Framework 70 remains stationary and fixed during the process of manufacturing the glass reinforced polymer composite laminate panel 12. Resin spray head 68 reciprocates in a direction along arrows E-E, which is transverse to arrow direction A in which the panel is moving. As with resin spray head 62, the resin spray head pattern and speed may be adjusted to adjust the thickness of resin deposited at spray laminating resin station 34. Known resins may be utilized including those containing cobalt and peroxide.

Figure 7:
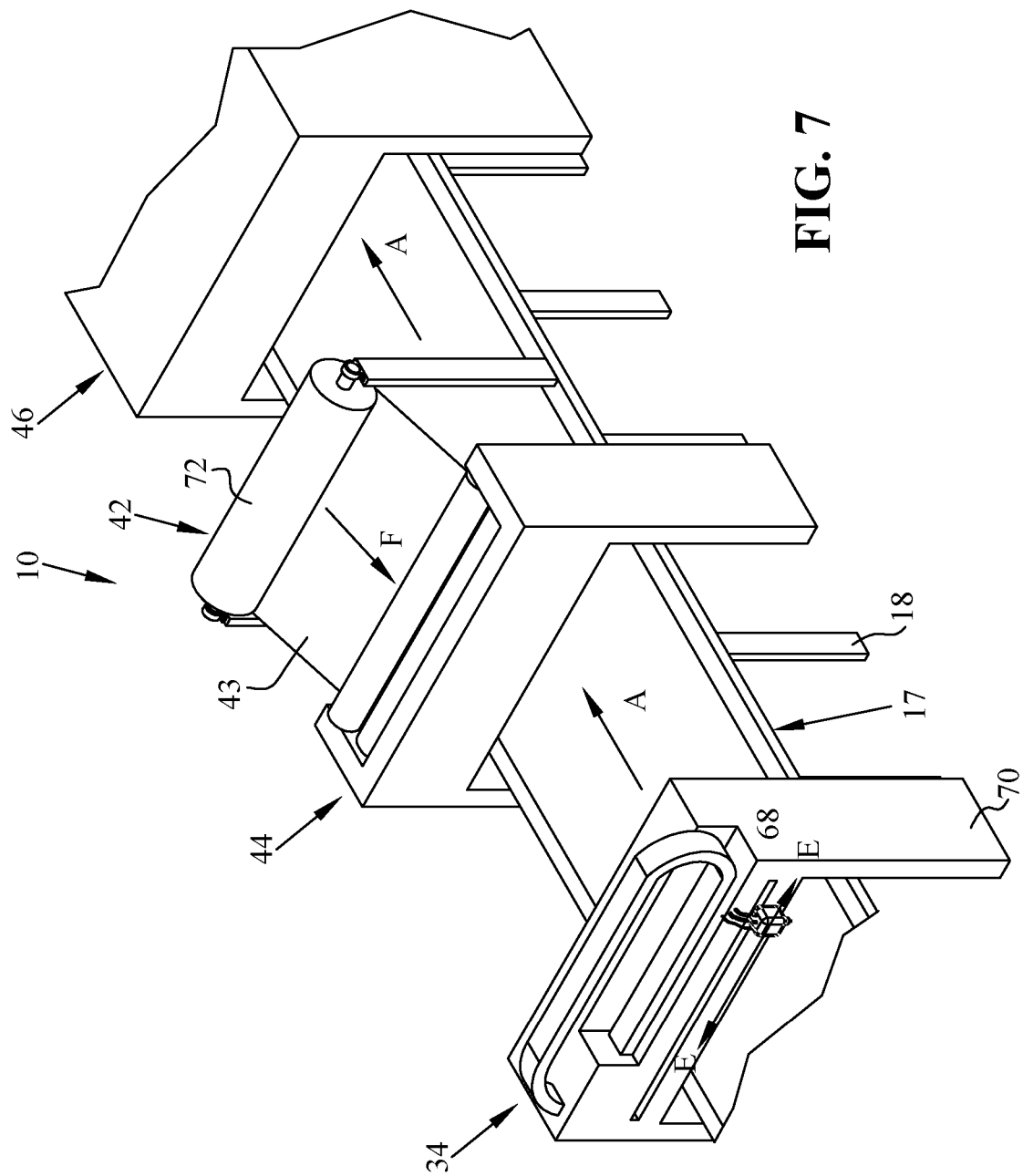
FIG. 7 is a view of a top milo roll feeding station.
Figure 8:
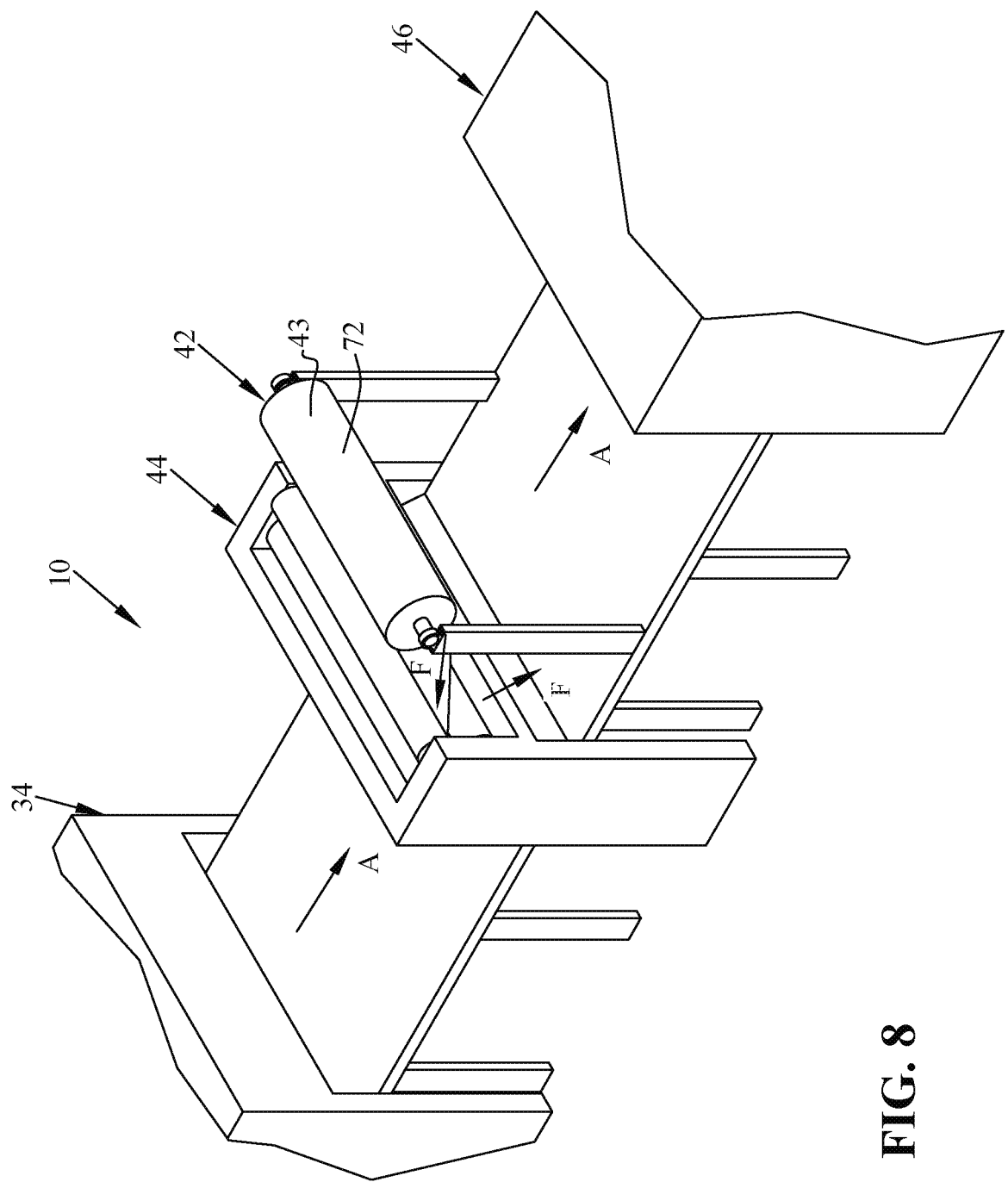
FIG. 8 is an opposite perspective view of the top Mylar roll feeding station heading into a dryer station.

Now referring to FIGS. 7 and 8, enlarged views of the feed station 42 for top Mylar film 43 and the nip rolling station 44 are depicted. As the laminate panel exits spray laminating resin station 34 and continues to travel down line 10 in the direction of arrow A, a top layer of Mylar film 43 is introduced. Feeding station 42 includes a roll 72 having a Mylar film mounted thereon which is fed in the direction of arrow F into nip rolling station 44. Mylar film 43 is directed down on the top of the glass reinforced polymer composite laminate panel 12. Nip rolling station 44 serves to press the glass reinforced polymer composite laminate panel 12, together to mesh the surface veil, glass reinforced matte and resins together. After leaving nip rolling station 44, laminate panel 12 continues along arrow A into curing station 46, wherein the resin is cured to complete the panel. In one embodiment the curing oven heats the panel to approximately 100-120 degrees, and also in one embodiment the thickness of the final laminate panel is approximately 0.060 inches thick.

Figure 9:
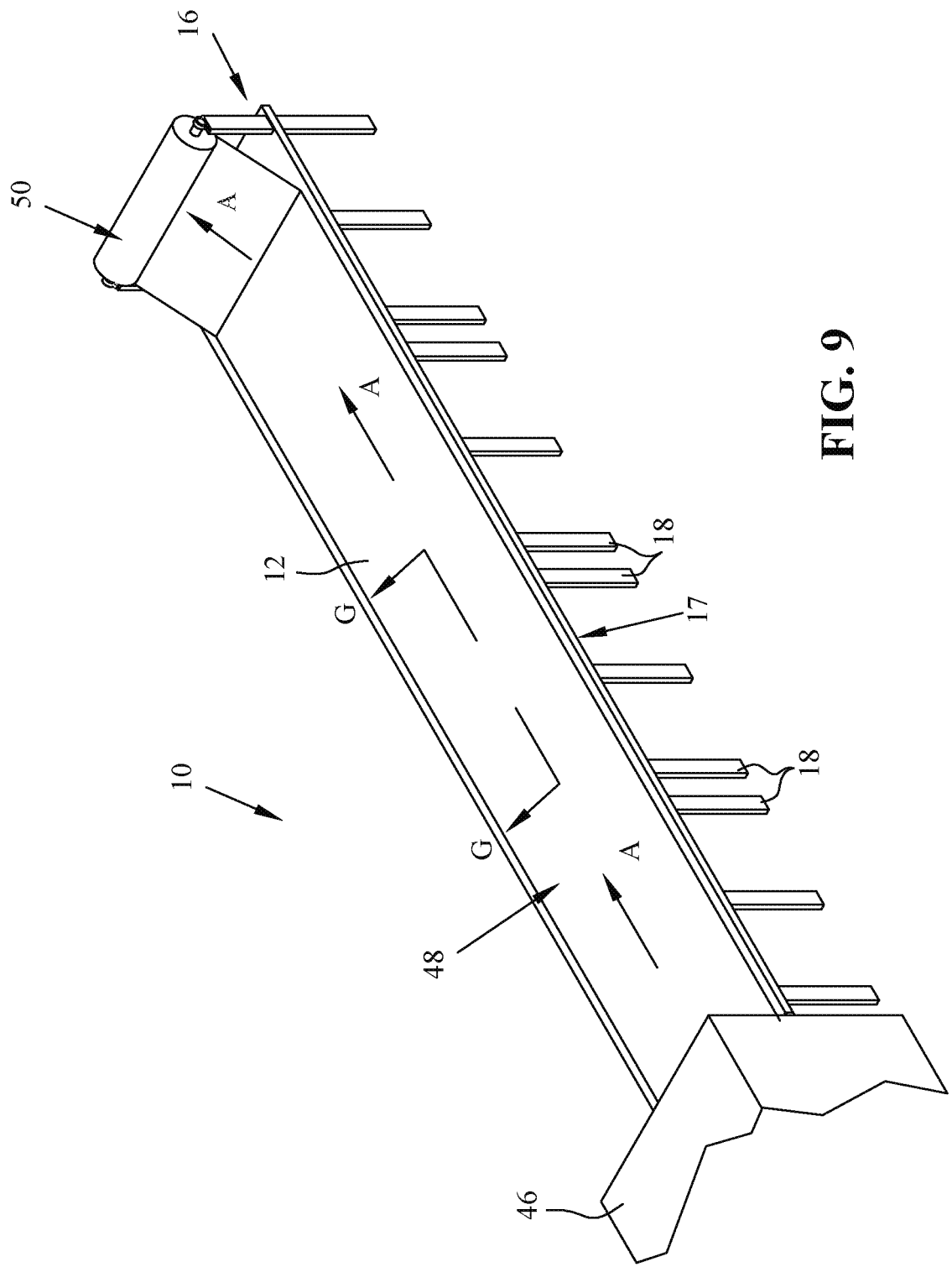
FIG. 9 is a drawing table in roll for the finished product.

Now referring to FIG. 9, an enlarged view of cooling station 48 is depicted. The laminate panel 12, as should be appreciated, is at an elevated temperature and very warm upon exiting cooling station 46. Accordingly, a long area 48 along line 10 is provided in which the glass reinforced polymer composite laminate panel 12 is cooled down before rolling the finished panel onto end or finished roll 50. It should be appreciated that the panel width could be trimmed along cooling station 48, or alternately the panel may be trimmed while in a rolled condition or as desired at the OEM before it is installed on a vehicle.

Figure 11:
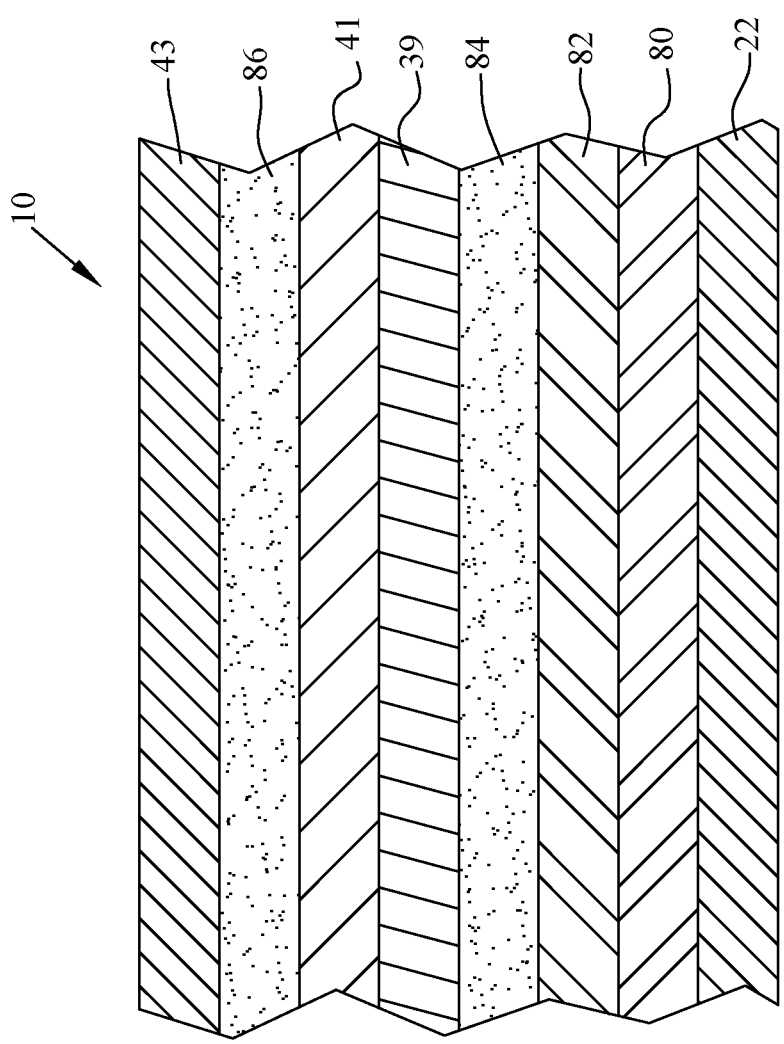
FIG. 11 is a cross-sectional view of the composite material taken along line G-G in FIG. 9.

Now referring to FIG. 11, a cross-sectional view taken along lines G-G of the completed glass reinforced polymer composite laminate panel 12 is depicted. The depiction is for illustrative purposes only and each of the layers are shown as separated from one another in the order laid down, but it should be appreciated that the gel layers will actually form a single layer when cured and that the resin will be impregnated through the surface veil and glass reinforcement matter after going through press roller 66 and nip rolling station 44. The finished laminate panel 12 includes bottom and top Mylar films 22, 43, respectively, which for the manufacturing process above serve as the molds between which the laminate panel is deposited. The Mylar films are not intended to be part of the completed panel intended to be installed on the vehicle, but may remain on to protect the surface of the panel until such time. Alternately, one of the sheets of Mylar may be removed before the laminate panel 12 is rolled up in end roll 50. This will still keep a layer of Mylar between subsequent rolled layers of the panel on roll 50. Laminate panel 12 also includes first and second layers of gel coat 80, 82, respectively, which were deposited by gel coat spray stations 24, 26, respectively. On top of the gel coat layers is the first resin layer 84. As described above, the sheet of surface veil material 39 is laid down on top of the first resin layer 82, and fiberglass reinforcing sheet matte 41 is simultaneously laid down over the top of surface veil sheet 39. Also, as described above, the second resin layer 86 is sprayed over the top of the fiberglass reinforcing sheet 41. After the top Mylar sheet 43 is fed on top of the laminate panel 12, the assembly is nip rolled before curing.

While the invention has been taught with specific reference to these embodiments, one skilled in the art will recognize that changes can be made in form and detail without departing from the spirit and scope of the invention. For instance, although the embodiments shown and described above utilizes sheet of fiberglass material, the composite material may utilize fiberglass in other forms or utilize other suitable substitute materials Also, the top and bottom Mylar sheets may be the same thicknesses or one may be thicker than the other. Therefore, the described embodiments are to be considered in all respects only as illustrative and not restrictive. As such, the scope of the invention is indicated by the following claims rather than by the description.

The invention claimed is:
1. A continuous process method for manufacturing a glassed reinforced polymer composite laminate panel of indeterminant length including the steps of:
    providing a moving mold comprising a flexible polymer film;
    depositing a layer of gel coat on said flexible polymer film;
    snap curing the layer of gel coat in a curing to provide a semi-rigid intermediate panel;
    applying a layer of resin material overtop of the cured gel coat layer;
    concurrently and simultaneously laying a sheet of woven or non-woven surface veil material over top of the cured gel coat layer, laying a sheet of glass reinforced matte overtop of said surface veil material, and roll pressing the sheet of surface veil material and the glass reinforced matte into the layer of resin material, all performed along a singular line across the flexible polymer film transverse to a longitudinal direction in which the flexible polymer film moves;
    applying a second layer of resin material overtop the sheet of glass reinforced matte to form the glass reinforced polymer composite laminate panel; and
    curing the glass reinforced polymer composite laminate panel.

2. The method for manufacturing a glassed reinforced polymer composite laminate panel as set forth in claim 1, further including the step of applying a second flexible polymer film on top of the second layer of resin material before the composite laminate panel is cured.

3. The method for manufacturing a glassed reinforced polymer composite laminate panel as set forth in claim 2, further including the step of nip rolling all of the layers together to integrate resin into the sheet of surface veil material and sheet of glass reinforced matte.

4. The method for manufacturing a glassed reinforced polymer composite laminate panel as set forth in claim 3, further including the step of providing a cooling area where the continuously fed composite laminate panel is cooled after curing.

5. The method for manufacturing a glassed reinforced polymer composite laminate panel as set forth in claim 4, further including the steps of providing an end roll and rolling the cooled composite laminate panel on the end roll.

6. The method for manufacturing a glassed reinforced polymer composite laminate panel as set forth in claim 5, further including the step of trimming the composite laminate panel to a desired width.

7. The method for manufacturing a glassed reinforced polymer composite laminate panel as set forth in claim 5, further including the step of removing the sheets of polymer film after the polymer composite laminate panel has cooled.

8. The method for manufacturing a glassed reinforced polymer composite laminate panel as set forth in claim 5, wherein the polymer films, surface veil material, and sheet of glass reinforced matte are fed from rolls of respective material.

9. The method for manufacturing a glassed reinforced polymer composite laminate panel as set forth in claim 5, further including the steps of removing one of the flexible polymer films and leaving the other before rolling the cooled composite laminate panel on the end roll, the remaining flexible polymer film protecting adjacent surfaces of the panel until ready to be installed.

10. The method for manufacturing a glassed reinforced polymer composite laminate panel as set forth in claim 3, further including the step of applying a second layer of gel coat over the first layer of gel coat before curing the gel coat and laying the sheet of surface veil material.

11. The method for manufacturing a glassed reinforced polymer composite laminate panel as set forth in claim 10, wherein the layers of gel coat are sprayed on the polymer film using reciprocating spray heads as the polymer film travels thereby.

12. The method for manufacturing a glassed reinforced polymer composite laminate panel as set forth in claim 11, wherein the resin layers are applied using reciprocating spray heads.

* * * * *